(12) United States Patent
Terao et al.

(10) Patent No.: US 8,519,666 B2
(45) Date of Patent: Aug. 27, 2013

(54) CHARGING SYSTEM INCLUDING A DEVICE HOUSING A BATTERY AND CHARGING PAD

(75) Inventors: Kyozo Terao, Sumoto (JP); Shoichi Toya, Minamiawaji (JP)

(73) Assignee: Sanyo Electric Co., Ltd., Osaka (JP)

( * ) Notice: Subject to any disclaimer, the term of this patent is extended or adjusted under 35 U.S.C. 154(b) by 392 days.

(21) Appl. No.: 12/954,713

(22) Filed: Nov. 26, 2010

(65) Prior Publication Data
US 2011/0128714 A1 Jun. 2, 2011

(30) Foreign Application Priority Data
Nov. 27, 2009 (JP) ................................ 2009-270603

(51) Int. Cl.
*H02J 7/00* (2006.01)
(52) U.S. Cl.
USPC .......................................................... 320/108
(58) Field of Classification Search
USPC .......................................................... 320/108
See application file for complete search history.

(56) References Cited

U.S. PATENT DOCUMENTS

| | | | | |
|---|---|---|---|---|
| 5,654,621 A * | 8/1997 | Seelig | ............................ | 320/108 |
| 7,605,496 B2 * | 10/2009 | Stevens et al. | .................. | 307/17 |
| 7,633,263 B2 * | 12/2009 | Toya | ............................. | 320/108 |
| 8,089,245 B2 * | 1/2012 | Kato et al. | ...................... | 320/108 |
| 2001/0039804 A1 * | 11/2001 | Newman et al. | ................... | 62/66 |
| 2002/0000788 A1 * | 1/2002 | Ostergaard et al. | ............ | 320/128 |
| 2004/0090193 A1 * | 5/2004 | Rudolph et al. | ............... | 315/312 |
| 2004/0179321 A1 * | 9/2004 | Woo et al. | ...................... | 361/150 |
| 2007/0217229 A1 * | 9/2007 | Thor et al. | ........................ | 363/17 |
| 2008/0169706 A1 * | 7/2008 | Onishi et al. | ................... | 307/104 |
| 2008/0197711 A1 * | 8/2008 | Kato et al. | ..................... | 307/104 |
| 2008/0303479 A1 * | 12/2008 | Park et al. | ...................... | 320/108 |
| 2009/0302800 A1 * | 12/2009 | Shiozaki et al. | ............... | 320/108 |
| 2010/0073177 A1 * | 3/2010 | Azancot et al. | ............... | 340/657 |
| 2010/0295506 A1 * | 11/2010 | Ichikawa | ...................... | 320/108 |
| 2011/0031927 A1 * | 2/2011 | Kajouke et al. | ............... | 320/108 |

FOREIGN PATENT DOCUMENTS
JP 9-63655 3/1997

* cited by examiner

*Primary Examiner* — Arun Williams
(74) *Attorney, Agent, or Firm* — Wenderoth, Lind & Ponack, L.L.P.

(57) ABSTRACT

A charging pad is provided with a power supply coil, and a device housing a battery containing an induction coil. The device housing a battery is provided with a rectifying circuit that rectifies AC power induced in the induction coil, a charging circuit that charges the internal battery with output from the rectifying circuit, a shorting circuit that short circuits the terminals of the induction coil, and a control circuit that controls the shorting circuit ON when a charging abnormality is detected. If the control circuit detects a charging abnormality during power transmission from the charging pad power supply coil to the device housing a battery induction coil, it controls the shorting circuit ON to cut-off the supply of power from the induction coil to the rectifying circuit.

12 Claims, 11 Drawing Sheets

CHARGING SYSTEM INCLUDING A DEVICE HOUSING A BATTERY AND CHARGING PAD

BACKGROUND OF THE INVENTION

1. Field of the Invention

The present invention relates to a device housing a battery (or batteries) such as a battery pack or mobile telephone, and to a charging pad that transmits power by magnetic induction to the device housing a battery to charge the battery inside.

2. Description of the Related Art

A charging pad (charging stand, charging cradle) has been developed to charge an internally housed battery by transmitting power from a power supply coil (transmitting coil, primary coil) to an induction coil (receiving coil, secondary coil) by magnetic induction (refer to Japanese Laid-Open Patent Publication H09-63655 [1997]).

JP H09-63655A cites a configuration with a charging pad housing a power supply coil driven by an alternating current (AC) power source, and a battery pack containing an induction coil that magnetically couples with the power supply coil. The battery pack houses circuitry to rectify AC power induced in the induction coil and supply the rectified power to charge the internal battery. With this system, a battery pack can be placed on the charging pad to charge the battery pack battery without direct physical contact.

In the battery charging system described above, AC power induced in the induction coil is rectified by a rectifying circuit and converted to direct current (DC) that can charge the battery. A bridge circuit of rectifying circuit elements such as diodes is used as the rectifying circuit. However, heat generated by the rectifying circuit elements in the bridge circuit is a problem. In particular, when high-voltage rectifying circuit elements are used to prevent damage under certain abnormal conditions, the ON-state voltage drop across the rectifying circuit elements is increased and the amount of heat generated becomes large. In a battery charging system that transmits power by magnetic induction to charge an internally housed battery, it is important to reduce temperature rise in the device housing a battery during charging. This is because heat has a detrimental effect on the battery and internal electronic components.

Rectifying circuit heat generation can be reduced by reducing the voltage drop across the rectifying circuit elements. A synchronous rectifying circuit using field effect transistors (FETs) as the rectifying circuit elements can reduce rectifying circuit element voltage drop and reduce the amount of heat generated. In this synchronous rectifying circuit, FETs connected in the bridge circuit are controlled ON and OFF synchronous with AC power induced in the induction coil to rectify the AC in the same manner as a diode bridge. Since the ON-resistance of the FETs in a synchronous rectifying circuit is low, heat generation can be reduced. This is because FET rectifying circuit element heat generation is proportional to the power loss, which is the FET ON-resistance times the current squared. To reduce the ON-resistance of a semiconductor device such as a FET serving as a rectifying circuit element, the ability of that device to withstand high-voltages (voltage rating) must be reduced. However, if power is supplied from the power supply coil to the induction coil with the output of the rectifying circuit disconnected from the battery, the AC voltage induced in the induction coil will increase. This is because the voltage of the induction coil increases under no-load conditions. If the voltage rating of the rectifying circuit elements is reduced, this situation invites the detrimental effect that induction coil voltage can exceed the voltage rating and damage the rectifying circuit elements. For example, this situation can occur if control of the charging pad malfunctions. Specifically, this situation can occur if the internally housed battery becomes fully charged and the power supply coil remains in an excited state even though a signal to stop charging is sent to the charging pad from the device housing a battery. Further, the no-load condition results from activation of a protection circuit that open-circuits the battery to prevent over-charging.

The present invention was developed with the object of preventing the detrimental effects described above. Thus, it is a primary object of the present invention to provide a device housing a battery and charging pad that can effectively prevent damage resulting from voltages that exceed the voltage rating of the rectifying circuit elements used in the rectifying circuit while reducing heat generation from the rectifying circuit.

SUMMARY OF THE INVENTION

The device housing a battery and charging pad of the present invention is made up of a charging pad 10 provided with a power supply coil 11, and a device housing a battery 50, 70 containing an induction coil 51 that magnetically couples with the power supply coil 11. The internal battery 52 contained in the device housing a battery 50, 70 is charged by power transmitted from the power supply coil 11 to the induction coil 51. The device housing a battery 50, 70 is provided with a rectifying circuit 53 that rectifies AC power induced in the induction coil 51, a charging circuit 54 that charges the internal battery 52 contained in the device housing a battery 50, 70 with output from the rectifying circuit 53, a shorting circuit 56, 76 that short circuits the terminals of the induction coil 51, and a control circuit 57 that controls the shorting circuit 56, 76 ON when a charging abnormality is detected. The control circuit 57 detects a charging abnormality during power transmission from the charging pad 10 power supply coil 11 to the device housing a battery 50, 70 induction coil 51, and controls the shorting circuit 56, 76 ON to cut-off the supply of power from the induction coil 51 to the rectifying circuit 53.

In the device housing a battery described above, circuit elements with a low voltage rating are used as the rectifying circuit elements in the rectifying circuit that rectifies AC power induced in the induction coil. This reduces rectifying circuit element ON-resistance resulting in reduced voltage drop and less heat generation. Further, when a charging abnormality occurs, the induction coil is short circuited by the shorting circuit to cut-off the supply of power from the induction coil to the rectifying circuit. Consequently, this achieves the characteristic that high-voltage damage to the rectifying circuit elements used in the rectifying circuit can be effectively prevented. Specifically, the system has the characteristic that rectifying circuit element damage due to abnormally high-voltage can be reliably prevented while reducing heat generation in the device housing a battery.

The device housing a battery and charging pad of the present invention can employ a synchronous rectifying circuit 53X as the rectifying circuit 53. In this device housing a battery, since the rectifying circuit is a synchronous rectifying circuit using semiconductor switching devices such as FETs, rectifying circuit element ON-resistance can be further reduced to lower heat generation even more.

The device housing a battery and charging pad of the present invention can have a synchronous rectifying circuit 53X provided with a FET bridge circuit 60, and FETs in the FET bridge circuit 60 can serve a dual purpose as the shorting circuit 76. In this device housing a battery, when abnormal charging conditions occur, FETs in the FET bridge circuit of the synchronous rectifying circuit serve as the shorting circuit to cut-off power supplied from the induction coil. Therefore, provision of a special-purpose shorting circuit is unnecessary, circuit structure is simplified, and manufacturing cost can be reduced.

In the device housing a battery and charging pad of the present invention, the shorting circuit 56, 76 can short circuit the induction coil 51 terminals through a series capacitor 55. In this device housing a battery, since the shorting circuit short circuits the output-side of the induction coil through a series capacitor, induction coil heat generation can be effectively prevented when the shorting circuit is in the enabled short circuit state.

The device housing a battery and charging pad of the present invention can be provided with a positive temperature coefficient device (PTC device) 59 connected in series with the induction coil 51, and the PTC device 59 can activate to cut-off power supplied from the induction coil 51 to the rectifying circuit 53 when abnormal power is supplied to the induction coil 51. In this device housing a battery, if abnormal AC power is supplied to the induction coil, the PTC device is activated to essentially cut-off induction coil current. For example, if the device housing a battery is (accidentally) placed on an inductive heating (IH) cooking device subjecting the induction coil to abnormal power, the PTC device will activate and cut-off induction coil current. In this type situation, charging of the internal battery will stop, and the input of high-voltage AC power to the rectifying circuit will be prevented to avoid damaging the rectifying circuit. Further, in the case of the inductive heating cooking device, since the PTC device will return to a low-resistance state once the device housing a battery is removed from the cooking device, charging of the internal battery can be resumed by properly setting it on the charging pad.

The above and further objects of the present invention as well as the features thereof will become more apparent from the following detailed description to be made in conjunction with the accompanying drawings.

DETAILED DESCRIPTION OF THE INVENTION

The following describes embodiments of the present invention based on the figures. However, the following embodiments are merely specific examples of a device housing a battery and charging pad representative of the technology associated with the present invention, and the device housing a battery and charging pad of the present invention is not limited to the embodiments described below. Further, elements indicated in the appended claims are in no way limited to the elements indicated in the embodiments.

Figure 1:
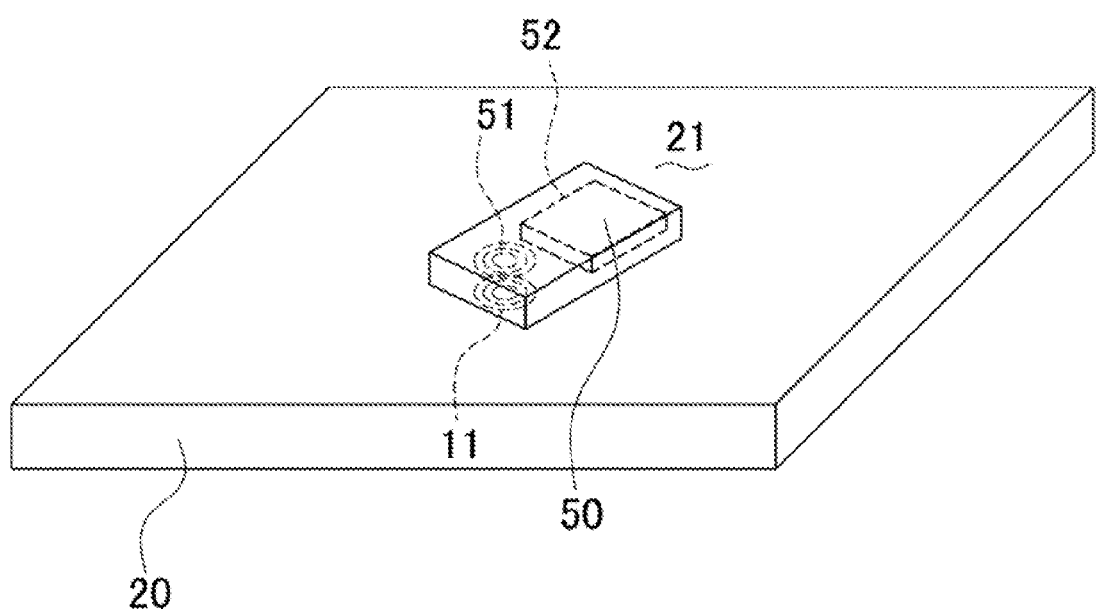
FIG. 1 is an oblique view of the device housing a battery and charging pad for an embodiment of the present invention.
Figure 2:
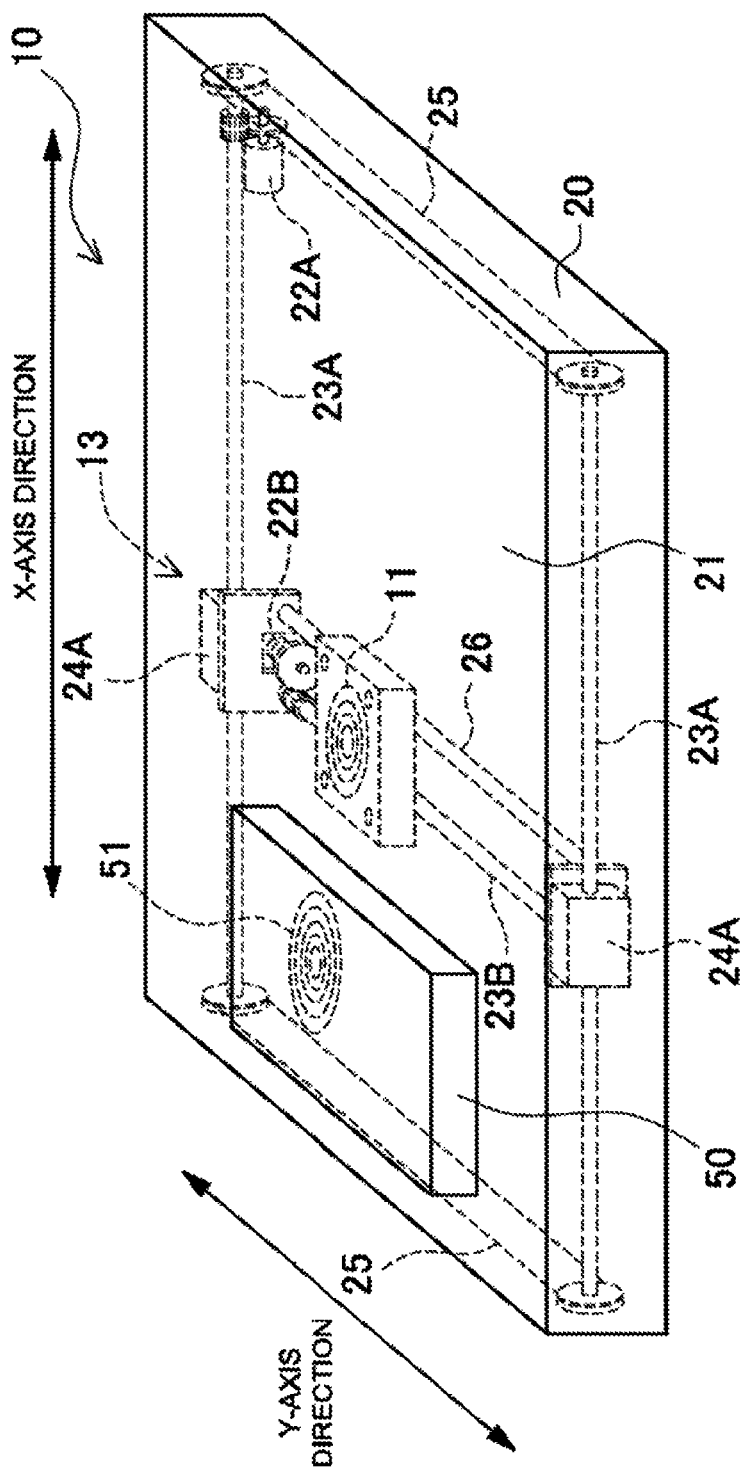
FIG. 2 is an abbreviated oblique view showing the internal structure of the charging pad shown in FIG. 1.
Figure 3:
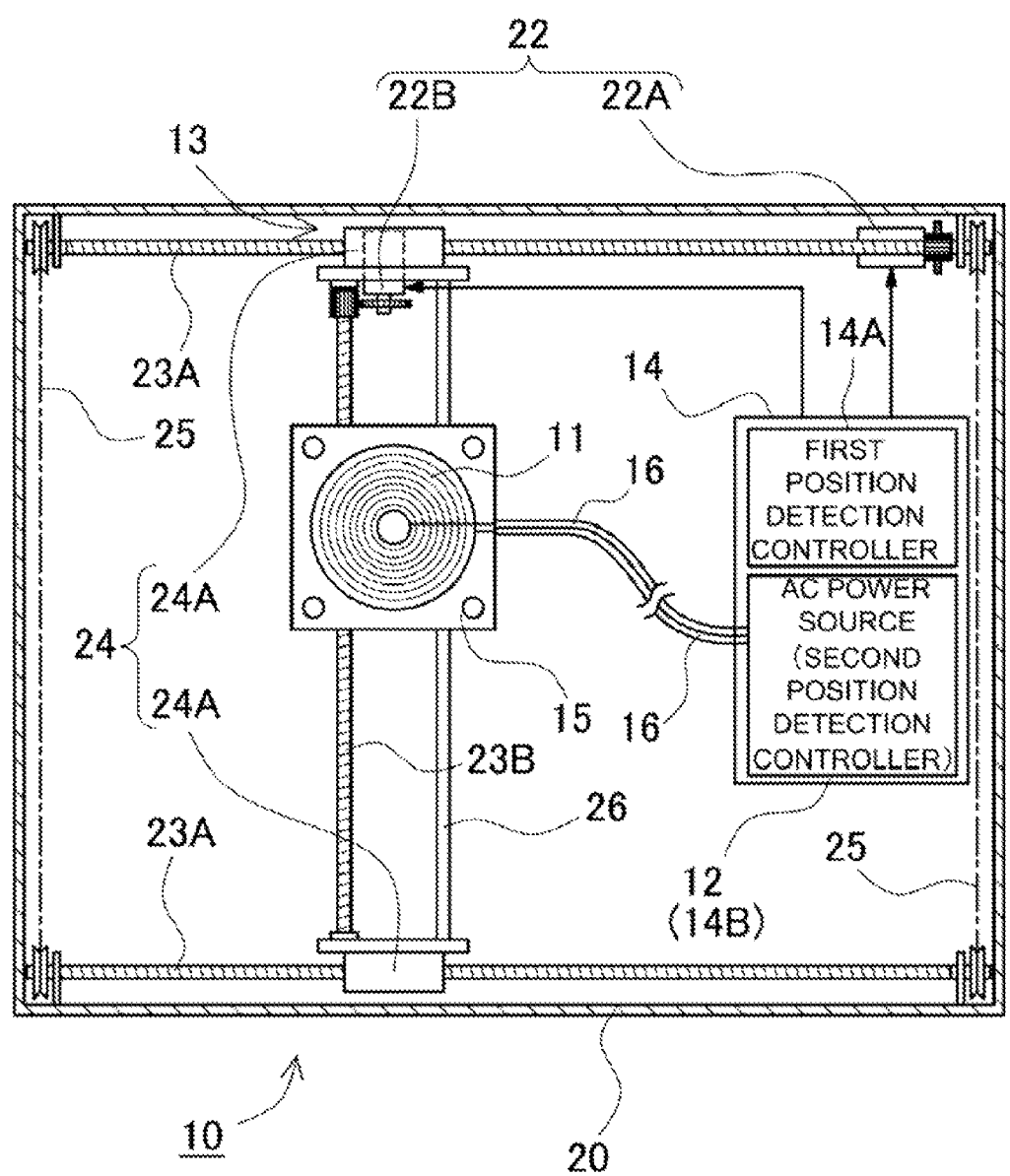
FIG. 3 is a horizontal cross-section view showing the internal structure of the charging pad shown in FIG. 1.
Figure 4:
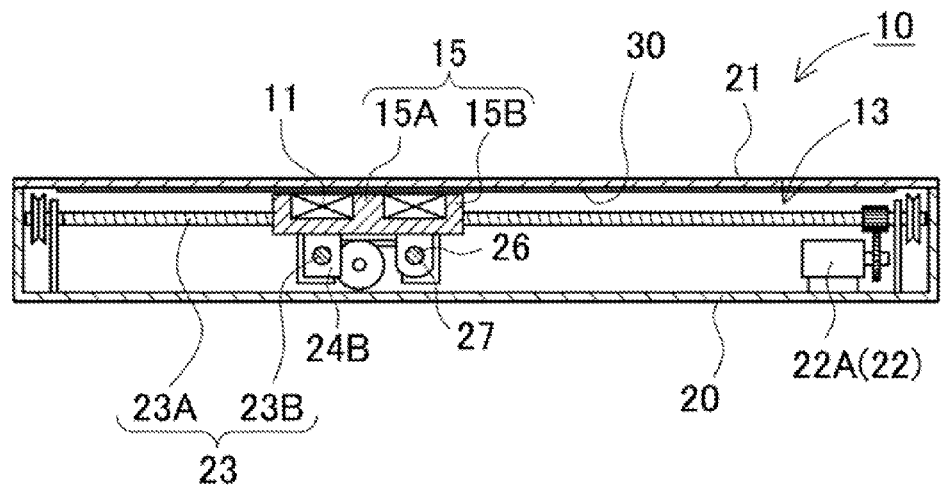
FIG. 4 is a lengthwise vertical cross-section view of the charging pad shown in FIG. 3.
Figure 5:
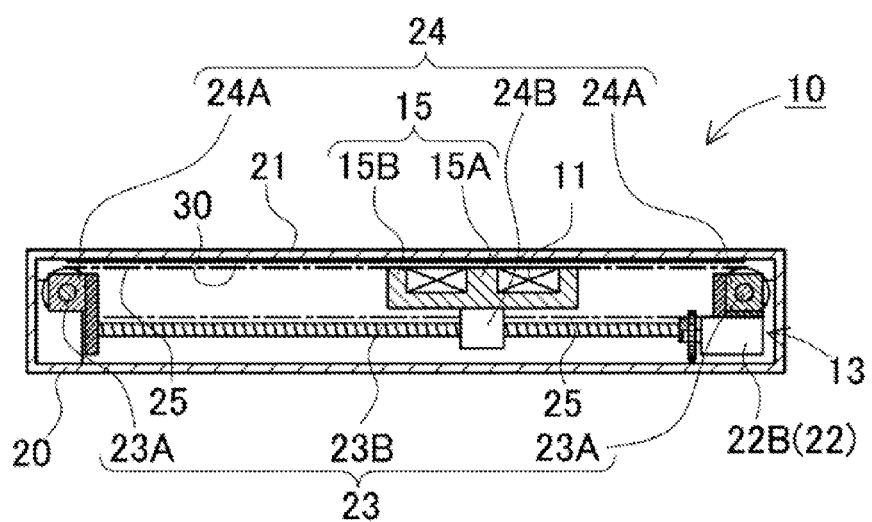
FIG. 5 is a widthwise vertical cross-section view of the charging pad shown in FIG. 3.
Figure 6:
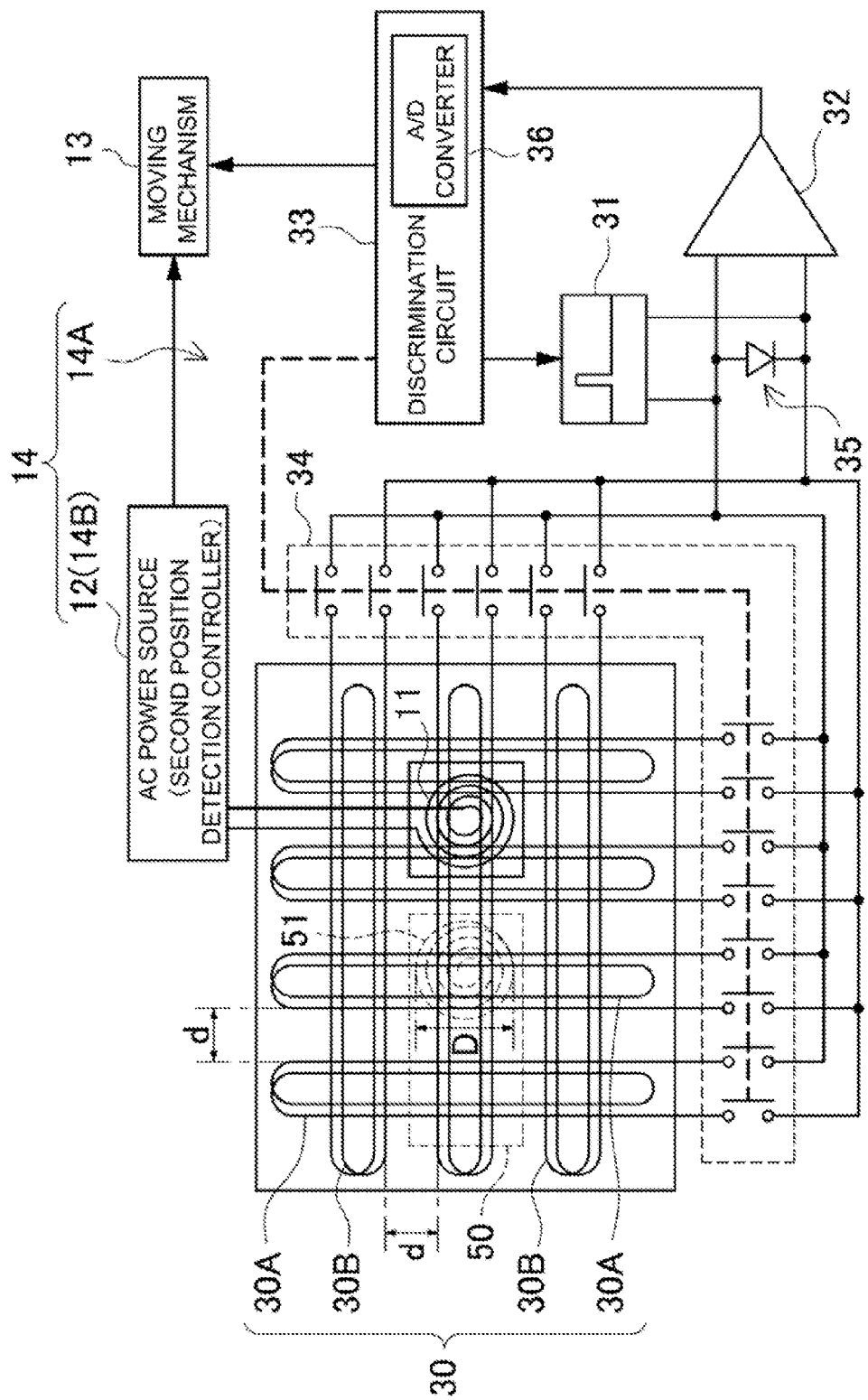
FIG. 6 is a circuit diagram showing one example of a charging pad position detection controller.
Figure 7:
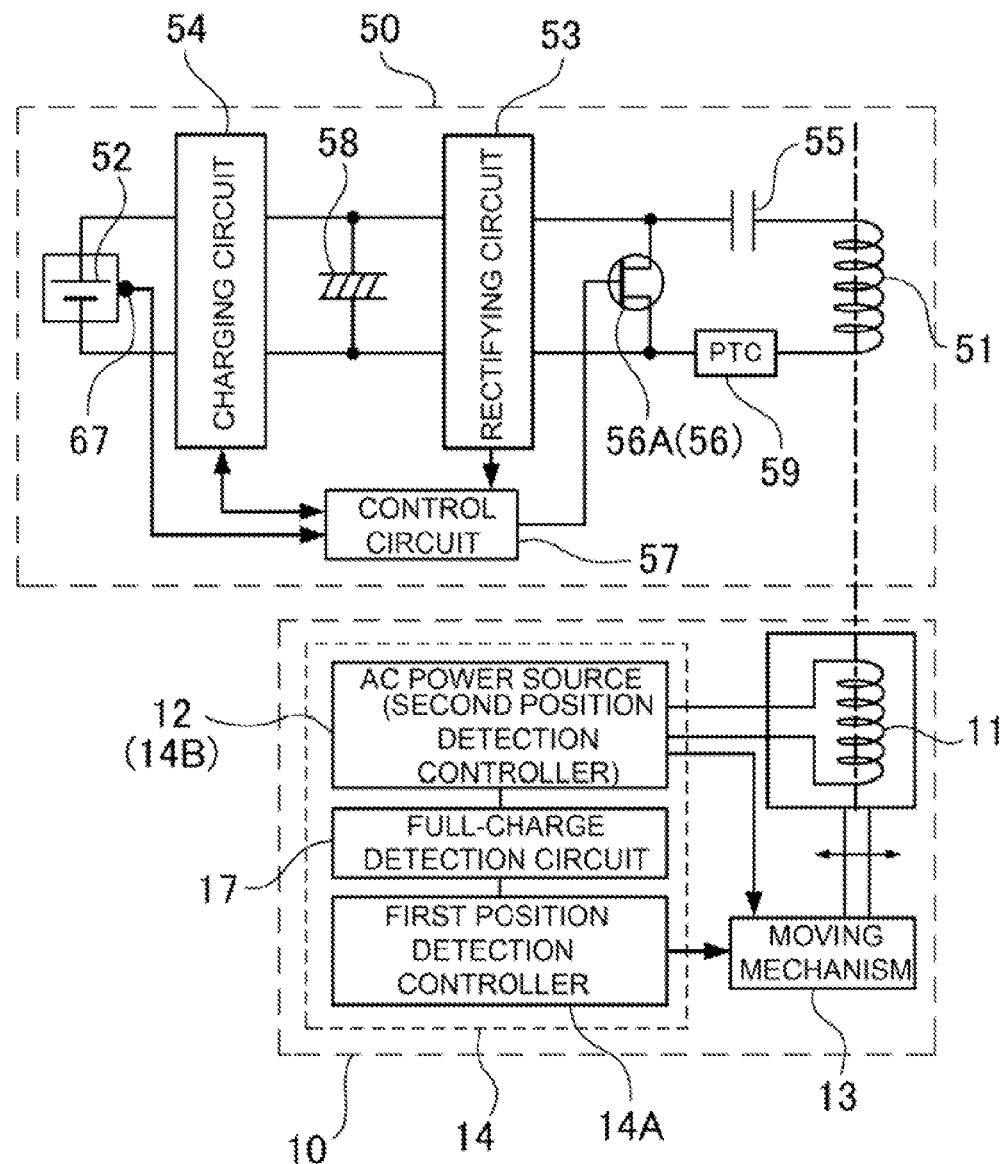
FIG. 7 is a block diagram of a device housing a battery and charging pad for an embodiment of the present invention.

FIGS. 1-7 show structural overviews and operating principle diagrams of the charging pad 10. As shown in FIGS. 1, 2, and 7, a device housing a battery 50 is placed on top of the charging pad 10 to charge the internally housed battery 52 via magnetic induction. The device housing a battery 50 contains an induction coil 51 that magnetically couples with the power supply coil 11. The internally housed battery 50 is charged by power induced in the induction coil 51.

Figure 8:
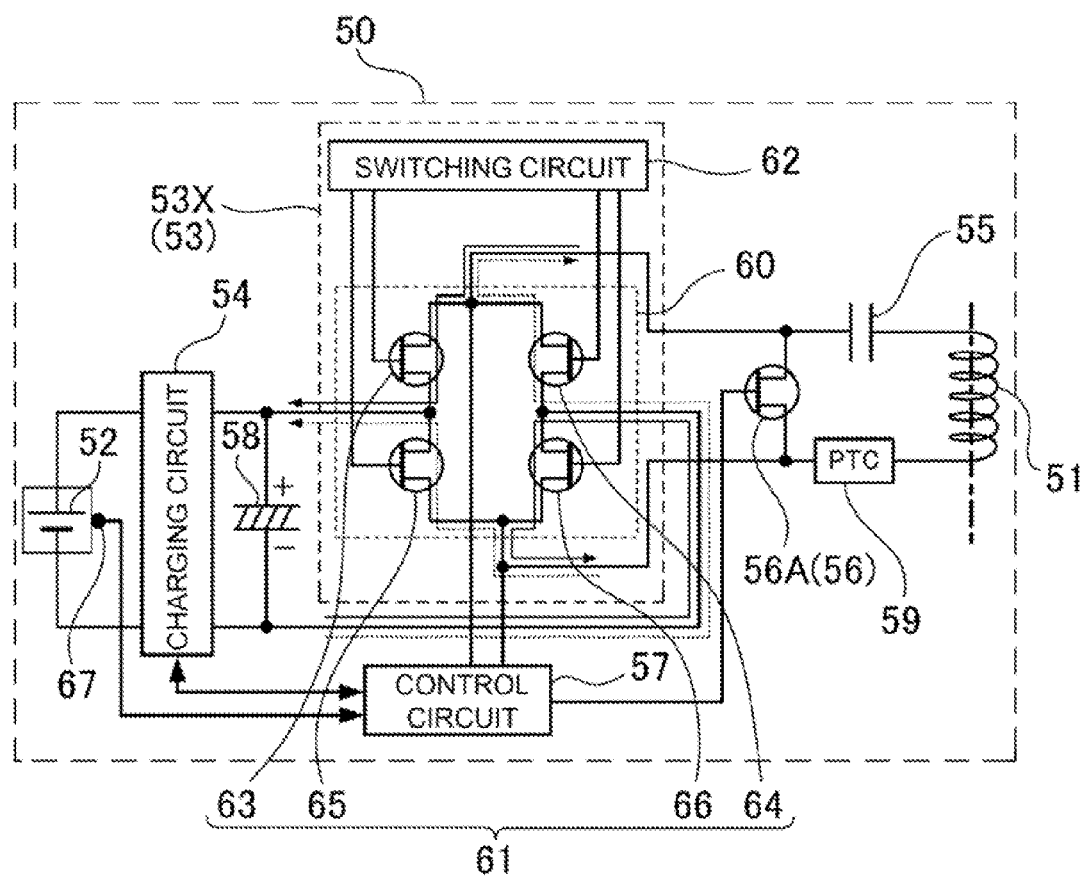
FIG. 8 is a circuit diagram of the device housing a battery shown in FIG. 7.

FIG. 8 shows a circuit diagram of the device housing a battery 50. This device housing a battery 50 is provided with a rectifying circuit 53 that rectifies AC power induced in the induction coil 51, a charging circuit 54 that charges the internal battery 52 contained in the device housing a battery 50 with output from the rectifying circuit 53, a shorting circuit 56 that short circuits the terminals of the induction coil 51, and a control circuit 57 that controls the shorting circuit 56 ON when a charging abnormality is detected.

The rectifying circuit 53 rectifies AC power induced in the induction coil 51 and outputs the rectified power to the charging circuit 54. The device housing a battery 50 of the figures has a series capacitor 55 connected between the induction coil 51 and the rectifying circuit 53, and AC power induced in the induction coil 51 is input to the rectifying circuit 53 through that series capacitor 55. The series capacitor 55 forms a series resonant circuit with the induction coil 51 to efficiently input AC power induced in the induction coil to the rectifying circuit 53. Accordingly, the capacitance of the series capacitor 55 is selected to combine with the induction coil 51 impedance for an overall impedance having a minimum near the frequency of the induced AC power. In addition, the device housing a battery 50 has an electrolytic capacitor 58 connected at the output-side of the rectifying circuit 53 to smooth ripple current in the rectifying circuit 53 output.

The rectifying circuit 53 is provided with rectifying circuit elements 61 to rectify AC input from the induction coil 51. The rectifying circuit 53 shown in FIG. 8 is a synchronous rectifying circuit 53X that uses FETs as the rectifying circuit elements 61. A synchronous rectifying circuit 53X using semiconductor switching devices such as FETs as the rectifying circuit elements 61 has the characteristic that rectifying circuit element ON-resistance and heat generation can be reduced. However, the rectifying circuit can also use diodes or any semiconductor devices developed in the future as the rectifying circuit elements.

The synchronous rectifying circuit 53X is presently marketed and available as an integrated circuit (IC). The synchronous rectifying circuit 53X is provided with a FET bridge circuit 60 having four FET 63, 64, 65, 66 rectifying circuit elements 61 connected in a bridge configuration in the same manner as a diode bridge, and a switching circuit 62 that controls the FET bridge circuit 60 FETs 63, 64, 65, 66 ON and OFF. The FET bridge circuit 60 has two p-channel FETs 63, 64 and two n-channel FETs 65, 66 connected in a bridge configuration, and those FETs 63, 64, 65, 66 are individually controlled ON and OFF by the switching circuit 62. The FET bridge circuit 60 connects two series-connected FETs 63, 65 in parallel with the other two series-connected FETs 64, 66.

The four FETs 63, 64, 65, 66 that make up the FET bridge circuit 60 are controlled ON and OFF by the switching circuit 62. The switching circuit 62 switches the four FETs 63, 64, 65, 66 in the FET bridge circuit 60 ON and OFF synchronous with the AC induced in the induction coil 51 to consistently connect the positive-side of the electrolytic capacitor 58 to the positive-side of the induction coil 51 and the negative-side of the electrolytic capacitor 58 to the negative-side of the induction coil 51. Here, the positive and negative-sides of the induction coil 51 swap at a rate set by the frequency of the AC power from the power supply coil 11. Accordingly, when the series capacitor 55 side of the induction coil 51 is positive, the switching circuit 62 controls two FETs 63, 66 ON and the other two FETs 64, 65 OFF to pass current in the manner shown by the solid-line arrows in FIG. 8. At this time, the p-channel FET 63 in the upper-left branch of the bridge and the n-channel FET 66 in the lower-right branch are turned ON, and the other FETs 64, 65 are turned OFF. Similarly, when the series capacitor 55 side of the induction coil 51 is negative, two FETs 64, 65 are switched ON and the other two FETs 63, 66 are switched OFF to pass current in the manner shown by the broken-line arrows in FIG. 8. At this time, the p-channel FET 64 in the upper-right branch of the bridge and the n-channel FET 65 in the lower-left branch are turned ON, and the other FETs 63, 66 are turned OFF. Since the series capacitor 55 side of the induction coil 51 terminals is switched positive and negative according to the frequency of the power supply coil 11, the switching circuit 62 detects the polarity of the induction coil 51 to switch the FETs 63, 64, 65, 66 ON and OFF.

The shorting circuit 56 short circuits the terminals of the induction coil 51 to cut-off the supply of power from the induction coil 51 to the rectifying circuit 53. The shorting circuit 56 of FIG. 8 short circuits the induction coil 51 terminals through the series capacitor 55. This configuration has the characteristic that induction coil 51 heat generation can be effectively prevented when the shorting circuit 56 is in the ON (shorted) state. The shorting circuit 56 of FIG. 8 is implemented by a shorting switch 56A that short circuits the output-side of the induction coil 51. The shorting switch 56A of the figure is a FET. However, a relay, or a semiconductor switching device such as a bipolar transistor can also be used as the shorting switch.

The shorting switch 56A, which is the shorting circuit 56, is controlled ON and OFF by the control circuit 57. The control circuit 57 detects charging abnormalities and controls the shorting switch 56A ON and OFF. When the control circuit 57 detects no charging abnormalities, it puts the shorting switch 56A FET in the OFF state. When the control circuit 57 detects a charging abnormality, it switches the FET shorting switch 56A ON. When the shorting switch 56A is in the ON-state, the output-side of the induction coil 51 is short circuited through the series capacitor 55, and the supply of power from the induction coil 51 to the synchronous rectifying circuit 53X is cut-off.

A charging abnormality can occur, for example, when power transmission from the charging pad 10 cannot be stopped even after protection circuitry in the device housing a battery 50 has disconnected the internal battery 52 due to over-charging. A charging abnormality can also occur in a situation such as when the device housing a battery 50 is (accidentally) placed on an inductive heating cooking device and abnormal power is induced in the induction coil 51. A situation where charging of the internally housed battery 52 is suspended but the supply of power from the charging pad 10 cannot be stopped can occur, for example, if the charging pad 10 malfunctions and cannot stop the supply of AC power to the power supply coil 11 even though a signal to stop charging has been sent to the charging pad 10 from the device housing a battery 50.

If the charging pad 10 malfunctions and continues to transmit power when charging of the internally housed battery 52 has stopped, protection circuitry will activate to cut-off the battery, the induction coil 51 will assume a no-load condition, and the induced voltage will become abnormally high. In particular, if the device housing a battery 50 is placed on an inductive heating cooking device, power transmitted to the induction coil 51 will be excessively high, and voltage induced in the induction coil 51 will exceed specifications. This condition can apply voltage that exceeds the voltage rating of the FET 63, 64, 65, 66 rectifying circuit elements 61 in the synchronous rectifying circuit 53X and can be the cause of FET 63, 64, 65, 66 damage.

The synchronous rectifying circuit 53X is configured with four FET 63, 64, 65, 66 rectifying circuit elements 61. To reduce power loss in the synchronous rectifying circuit 53X, FETs with low ON-resistance are used as the FETs 63, 64, 65, 66. This is because if power loss in the synchronous rectifying circuit 53X is large, the device housing a battery 50 will generate considerable heat during charging of the internally housed battery 52. Excessive heat generation can be the cause of degradation or failure of the internal battery 52 or electronic components in the device housing a battery 50. The ON-resistance of the FETs 63, 64, 65, 66 can be reduced by reducing the ability of the FETs to withstand high voltages (voltage rating). For example, the ON-resistance of a FET with a 20V voltage rating is approximately 400 mΩ, while a FET having the same chip area with a voltage rating of 5V can have a considerably lower ON-resistance of approximately 150 mΩ.

Consequently, if the synchronous rectifying circuit 53X FET 63, 64, 65, 66 rectifying circuit elements 61 use devices with a voltage rating that can withstand induction coil 51 power with a load connected, namely devices rated for conditions where the internally housed battery 52 is charged by the induction coil 51, ON-resistance can be reduced and detrimental effects due to heat generation can be prevented. However, FETs with a voltage rating selected for the loaded induction coil 51 configuration can be damaged and fail if the induction coil 51 assumes a no-load configuration and voltage increases.

The device housing a battery 50 of FIG. 8 is provided with a shorting circuit 56 to prevent failure of the synchronous rectifying circuit 53X FET 63, 64, 65, 66 rectifying circuit elements 61 due to voltage that exceeds the voltage rating. As described previously, under abnormal charging conditions where voltage induced in the induction coil 51 becomes high, the shorting circuit 56 cuts-off the supply of AC power from the induction coil 51 to the synchronous rectifying circuit 53X. In the event of a charging abnormality, the control circuit 57 switches the shorting circuit 56 ON to short circuit the output-side of the induction coil 51 through the series capacitor 55. In this state, no AC power is input from the induction coil 51 to the synchronous rectifying circuit 53X, and high-voltage damage to the synchronous rectifying circuit 53X FET 63, 64, 65, 66 rectifying circuit elements 61 is prevented.

Figure 9:
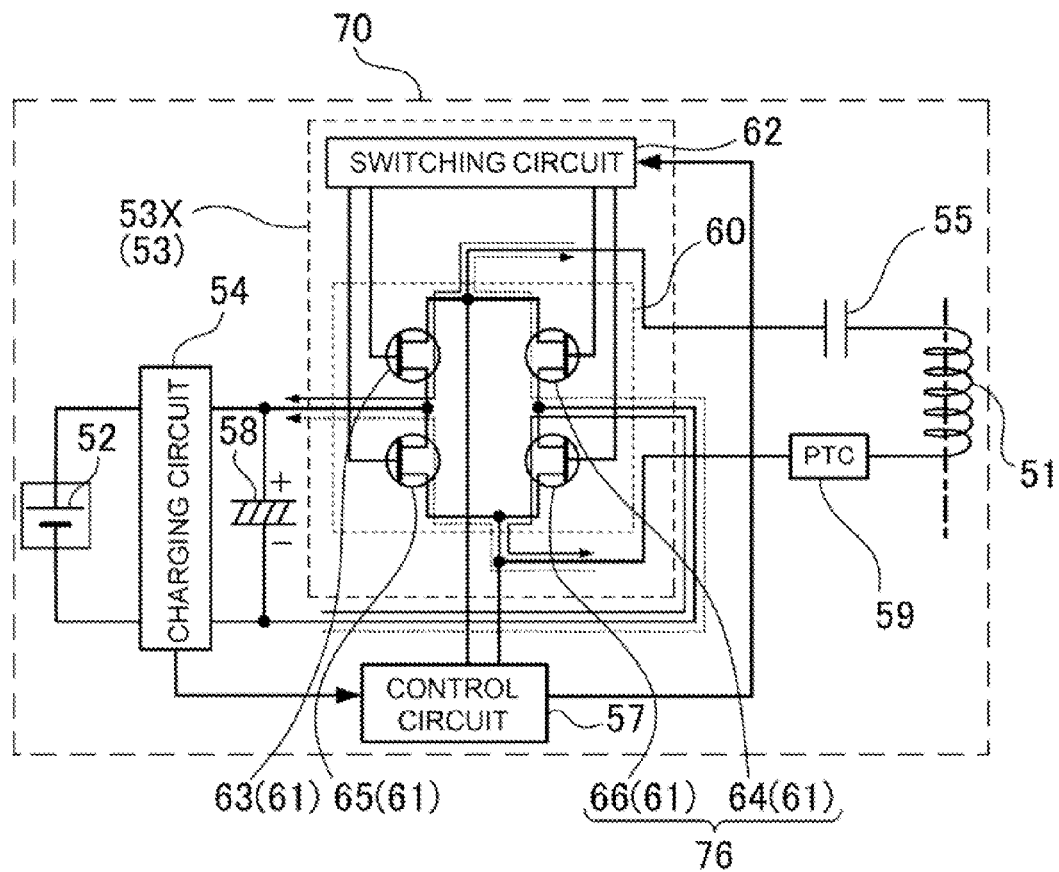
FIG. 9 is a circuit diagram showing another example of a device housing a battery.

Further, as shown in FIG. 9, rectifying circuit elements 61 of the synchronous rectifying circuit 53X in the device housing a battery can serve additionally as the shorting circuit 76. The device housing a battery 70 of the figure uses the series-connected FETs 64, 66, which are part of the FET bridge circuit 60, as the shorting circuit 76, which is configured to short circuit the terminals of the induction coil 51 through the series capacitor 55. The FETs 64, 66 that make up the shorting circuit 76 are controlled ON and OFF by the switching circuit 62. The switching circuit 62 controls the FETs 64, 66 ON and OFF in accordance with input signals from the control circuit 57 that detects charging abnormalities. In this device housing a battery 70, when no charging abnormality is detected by the control circuit 57, the switching circuit 62 controls the FETs 63, 64, 65, 66 as rectifying circuit elements 61 of the synchronous rectifying circuit 53X to rectify AC power input from the induction coil 51 and output the rectified power to the charging circuit 54. However, when the control circuit 57 detects a charging abnormality, the switching circuit 62 switches the FETs 64, 66 to a continuously-ON-state. and the FETs 64, 66 act as the shorting circuit 76 to short circuit the output-side of the induction coil 51 through the series capacitor 55. Consequently, when the control circuit 57 detects a charging abnormality, the synchronous rectifying circuit 53X is not operated as a rectifying circuit, but rather rectifying circuit elements 61 of the synchronous rectifying circuit 53X serve as the shorting circuit 76 that effectively cuts-off the supply of power to the rectifying circuit and thereby cuts-off power to the charging circuit 54. In this device housing a battery 70, if a charging abnormality occurs and induced voltage in the induction coil 51 becomes high, the output-side of the induction coil 51 is short circuited by holding the FETs 64, 66, which form the shorting circuit 76, in the ON-state. Therefore, high-voltage damage to the FETs 63, 64, 65, 66, which are the synchronous rectifying circuit 53X rectifying circuit elements 61, is prevented. This device housing a battery 70 does not require a previously described shorting switch to short circuit the output-side of the induction coil 51, but rather uses FETs 64, 66 that are rectifying circuit elements 61 in the synchronous rectifying circuit 53X for the dual purpose as the shorting circuit 76 that cuts-off power supplied from the induction coil 51. Therefore, circuit structure can be simplified and manufacturing cost can be reduced.

In addition, the device housing a battery 50, 70 of FIGS. 7-9 is provided with a positive temperature coefficient device (PTC device) 59 connected in series with the induction coil 51. Under normal conditions, the PTC device 59 has a low resistance. However, if temperature rises due to high current flow, the PTC device 59 will activate at a specific temperature and resistance will markedly increase to effectively cut-off current through the induction coil 51. If the shorting circuit 56, 76 is switched ON under conditions described previously and current induced in the induction coil 51 exceeds a set value, the PTC device 59 will activate to cut-off current through the induction coil 51. Consequently, even if the device housing a battery 50, 70 is placed on equipment such as an inductive heating (IH) cooking device, induction coil 51 current will be cut-off and the device housing a battery 50, 70 can be used safely. If the device housing a battery 50, 70 is removed from the cooking device, the PTC device 59 will recover to its normal low-resistance state. Accordingly, once the device housing a battery 50, 70 is removed from the cooking device, it can again be placed on the charging pad 10 to charge the internally housed battery 52.

Under normal conditions, the shorting circuit 56, 76 of the device housing a battery 50, 70 is in the OFF-state and AC power induced in the induction coil 51 is rectified by the synchronous rectifying circuit 53X, smoothed by the electrolytic capacitor 58, and used to charge the internally housed battery 52. Direct current (DC) output from the synchronous rectifying circuit 53X is controlled by the charging circuit 54 to charge the internal battery 52. The charging circuit 54 detects full-charge of the internal battery 52 and stops charging. A charging circuit 54 for a lithium ion internal battery 52 charges the battery to full-charge by constant voltage-constant current charging. A charging circuit 54 for a nickel hydride internal battery 52 charges the battery to full-charge by constant current charging.

Further, when the temperature of the internal battery 52 in the device housing a battery 50 of FIGS. 7 and 8 is below a set value, it can be warmed by high current from power transmitted from the charging pad 10. Prior-art charging pads are configured to avoid battery damage by not starting charging when battery temperature is below a set value (for example, 0° C.). In that case, it is necessary to wait for the battery temperature to rise to the set value before beginning charging. In contrast, when the temperature of the internal battery 52 for the device housing a battery 50 and charging pad 10 shown in FIGS. 7 and 8 is below the set value, internal battery 52 charging is not started but power is transmitted from the charging pad 10 to the device housing a battery 50. This warms the internal battery 52 via high current from the transmitted power and raises the battery temperature to a value that allows charging. Consequently, the time prior to starting charging can be reduced. The device housing a battery 50 of the figures is configured with a temperature sensor 67 that detects the temperature of the internal battery 52; the control circuit 57 compares the detected battery temperature with the set value and determines whether or not to start charging. In the situation where the temperature of the internal battery 52 is below the set value, the control circuit 57 transmits that information to the charging pad 10 and controls the shorting circuit 56 connected between the induction coil 51 terminals ON when power transmission from the charging pad 10 begins. Energy transmitted from the charging pad 10 is not used to charge the internal battery 52, but rather metal components surrounding the induction coil 51 and the internal battery 52 are heated by the high current. The temperature sensor 67 in the device housing a battery 50 periodically detects the battery temperature. When the detected battery temperature rises to the set value, the control circuit 57 controls the shorting circuit 56 OFF, and power is supplied from the induction coil 51 to the rectifying circuit 53 to begin charging the internal battery 52. In this manner, even when a device housing a battery with a battery temperature below the set value is placed on the charging pad and battery charging is not started, energy transmitted from the charging pad warms the battery to a temperature that allows charging to start quickly.

As shown in FIGS. 1-7, the charging pad 10 is provided with a power supply coil 11 connected to an AC power source 12 to induce electromotive force (emf) in the induction coil 51, a case 20 housing the power supply coil 11 and having a top plate 21 where a device housing a battery 50 is placed, a moving mechanism 13 housed in the case 20 that moves the power supply coil 11 along the inside surface of the top plate 21, and a position detection controller 14 that detects the position of a device housing a battery 50 placed on the top plate 21 and controls the moving mechanism 13 to move the power supply coil 11 in close proximity to the induction coil 51 in the device housing a battery 50. The power supply coil 11, AC power source 12, moving mechanism 13, and position detection controller 14 are housed inside the case 20 of the charging pad 10.

The charging pad 10 charges the battery 52 inside a device housing a battery 50 in the following manner.

(1) When a device housing a battery 50 is placed on the top plate 21 of the case 20, the position detection controller 14 detects its position.

(2) The position detection controller 14, which has detected the position of the device housing a battery 50, controls the moving mechanism 13 to move the power supply coil 11 along the inside of the top plate 21 and position it in close proximity to the induction coil 51 of the device housing a battery 50.

(3) The power supply coil 11, which has been moved close to the induction coil 51, is magnetically coupled to the induction coil 51 and transmits AC power to the induction coil 51.

(4) The device housing a battery 50 converts the induction coil 51 AC power to DC and charges the internal battery 52 with that DC power.

The charging pad 10, which charges the battery 52 in a device housing a battery 50 by the procedure described above, houses the power supply coil 11 connected to the AC power source 12 inside the case 20. The power supply coil 11 is disposed beneath the top plate 21 of the case 20 in a manner that allows it to move along the inside of the top plate 21. The efficiency of power transmission from the power supply coil 11 to the induction coil 51 is improved by narrowing the gap between the power supply coil 11 and the induction coil 51. With the power supply coil 11 moved into close proximity with the induction coil 51, the gap between the power supply coil 11 and the induction coil 51 is preferably less than or equal to 7 mm. Therefore, the power supply coil 11 is disposed under the top plate 21 and positioned as close as possible to the top plate 21. Since the power supply coil 11 is moved close to the induction coil 51 of the device housing a battery 50 placed on the top plate 21, the power supply coil 11 is disposed in a manner that allows it to move along the inside surface of the top plate 21.

The case 20 that houses the power supply coil 11 is provided with a planar top plate 21 where a device housing a battery 50 can be placed. The charging pad 10 of FIGS. 1 and 2 has a top plate 21 that is entirely planar and disposed horizontally. The top plate 21 is made large enough to allow placement of devices housing a battery 50 having different sizes and shapes. For example, the top plate 21 can have a rectangular shape with a side having a length of 5 cm to 30 cm. However, the top plate 21 can also have a circular shape with a diameter of 5 cm to 30 cm. The charging pad 10 of FIGS. 1 and 2 has a large top plate 21 that allows simultaneous placement of a plurality of devices housing a battery 50. Here, a plurality of devices housing a battery 50 can be placed on the top plate 21 at the same time to allow sequential charging of their internal batteries 52. Further, the top plate can also be provided with side-walls or other barriers around its perimeter, and devices housing a battery can be placed inside the side-walls to charge the internal batteries.

The power supply coil 11 is wound in a plane parallel to the top plate 21, and radiates AC magnetic flux above the top plate 21. This power supply coil 11 emits AC magnetic flux perpendicular to, and beyond the top plate 21. The power supply coil 11 is supplied with AC power from the AC power source 12 and radiates AC magnetic flux above the top plate 21. Wire can be wound around a magnetic material core 15 to make a power supply coil 11 with high inductance. The core 15 is magnetic material with a high magnetic permeability such as ferrite and has the shape of an open end container. The core 15 has a solid circular cylinder 15A at the center of the spiral wound power supply coil 11 and a circular cylindrical enclosure 15B around the outside that are joined by a bottom section (refer to FIGS. 4 and 5). A power supply coil 11 with a core 15 can focus magnetic flux in a specific region to efficiently transmit power to the induction coil 51. However, a magnetic material core is not always required in the power supply coil, and a coil with no core can also be used. Since a coil with no core is light, the moving mechanism that moves the power supply coil inside the top plate can be simplified. The power supply coil 11 is made with essentially the same outside diameter as the induction coil 51 to efficiently transmit power to the induction coil 51.

The AC power source 12 supplies high frequency power, for example 20 kHz to several MHz, to the power supply coil 11. The AC power source 12 is connected to the power supply coil 11 via flexible lead wires 16. This is because the power supply coil 11 has to be moved close to the induction coil 51 in a device housing a battery 50 placed on the top plate 21. Although not illustrated, the AC power source 12 is provided with a self-excited oscillator circuit, and a power amplifier to amplify the AC power output from the self-excited oscillator circuit. The self-excited oscillator circuit uses the power supply coil 11 as an oscillator circuit inductor. Consequently, the oscillator frequency changes with the inductance of the power supply coil 11. The inductance of the power supply coil 11 changes with the relative position of the power supply coil 11 with respect to the induction coil 51. This is because the mutual inductance of the power supply coil 11 and the induction coil 51 changes with the relative position of the power supply coil 11 with respect to the induction coil 51. Therefore, the frequency of the self-excited oscillator circuit, which uses the power supply coil 11 as an oscillator circuit inductor, changes as the power supply coil 11 approaches the induction coil 51. As a result, the self-excited oscillator circuit can detect the relative position of the power supply coil 11 with respect to the induction coil 51 from the change in oscillating frequency, and can be used with the dual purpose as a position detection controller 14.

The power supply coil 11 is moved in close proximity to the induction coil 51 by the moving mechanism 13. The moving mechanism 13 of FIGS. 2-5 moves the power supply coil 11 along the inside of the top plate 21 in the X-axis and Y-axis directions to position it close to the induction coil 51. The moving mechanism 13 of the figures rotates threaded rods 23 via servo motors 22 controlled by the position detection controller 14 to move nut blocks 24 that are threaded onto the threaded rods 23. The nut blocks 24 are moved to move the power supply coil 11 close to the induction coil 51. The servo motors 22 are provided with an X-axis servo motor 22A to move the power supply coil 11 in the X-axis direction, and a Y-axis servo motor 22B to move the power supply coil 11 in the Y-axis direction. The threaded rods 23 are provided with a pair of X-axis threaded rods 23A to move the power supply coil 11 in the X-axis direction, and a Y-axis threaded rod 23B to move the power supply coil 11 in the Y-axis direction. The pair of X-axis threaded rods 23A are disposed parallel to each other, and are connected via belts 25 to rotate together when driven by the X-axis servo motor 22A. The threaded nut blocks 24 are provided with a pair of X-axis nut blocks 24A that are threaded onto each X-axis threaded rod 23A, and a Y-axis nut block 24B that is threaded onto the Y-axis threaded rod 23B. Both ends of the Y-axis threaded rod 23B are connected to the X-axis nut blocks 24A in a manner allowing rotation. The power supply coil 11 is mounted on the Y-axis nut block 24B.

Further, the moving mechanism 13 of the figures has a guide rod 26 disposed parallel to the Y-axis threaded rod 23B to move the power supply coil 11 in the Y-axis direction while retaining it in a horizontal orientation. The guide rod 26 is connected at both ends to the X-axis nut blocks 24A and moves together with the pair of X-axis nut blocks 24A. The guide rod 26 passes through a guide block 27 attached to the power supply coil 11 to allow power supply coil 11 movement along the guide rod 26 in the Y-axis direction. Specifically, the power supply coil 11 is moved with horizontal orientation in the Y-axis direction via the Y-axis nut block 24B and guide block 27 that move along the parallel disposed Y-axis threaded rod 23B and guide rod 26.

When the X-axis servo motor 22A rotates the X-axis threaded rods 23A of this moving mechanism 13, the pair of X-axis nut blocks 24A moves along the X-axis threaded rods 23A to move the Y-axis threaded rod 23B and the guide rod 26 in the X-axis direction. When the Y-axis servo motor 22B rotates the Y-axis threaded rod 23B, the Y-axis nut block 24B moves along the Y-axis threaded rod 23B to move the power supply coil 11 in the Y-axis direction. Here, the guide block 27 attached to the power supply coil 11 moves along the guide rod 26 to maintain the power supply coil 11 in a horizontal orientation during movement in the Y-axis direction. Consequently, rotation of the X-axis servo motor 22A and Y-axis servo motor 22B can be controlled by the position detection controller 14 to move the power supply coil 11 in the X-axis and Y-axis directions. However, the charging pad of the present invention is not limited to a moving mechanism with the configuration described above. This is because any configuration of moving mechanism can be used that can move the power supply coil in the X-axis and Y-axis directions.

The position detection controller 14 detects the position of a device housing a battery 50 that is placed on the top plate 21. The position detection controller 14 of FIGS. 2-5 detects the position of the induction coil 51 housed in the device housing a battery 50, and moves the power supply coil 11 close to the induction coil 51. Further, the position detection controller 14 is provided with a first position detection controller 14A that roughly determines the position of the induction coil 51, and a second position detection controller 14B that determines the position of the induction coil 51 with precision. In this position detection controller 14, the first position detection controller 14A roughly determines the position of the induction coil 51 and controls the moving mechanism 13 to move the power supply coil 11 close to the induction coil 51. Subsequently, the second position detection controller 14B detects the induction coil 51 position with precision while controlling the moving mechanism 13 to move the power supply coil 11 more accurately to the position of the induction coil 51. This charging pad 10 can quickly move the power supply coil 11 close to the induction coil 51 with precision.

As shown in FIG. 6, the first position detection controller 14A is provided with a plurality of position detection coils 30 fixed to the inside of the top plate 21, a detection signal generating circuit 31 that supplies position detection signals to the position detection coils 30, a receiving circuit 32 that receives echo signals from the position detection coils 30 resulting from excitation of the induction coil 51 by position detection signals supplied to the position detection coils 30 from the detection signal generating circuit 31, and a discrimination circuit 33 that determines induction coil 51 position from the echo signals received by the receiving circuit 32.

The position detection coils 30 are made up of a plurality of coils in rows and columns. The plurality of position detection coils 30 is fixed with specified intervals between each coil on the inside surface of the top plate 21. The position detection coils 30 are provided with a plurality of X-axis detection coils 30A that detect induction coil 51 position on the X-axis, and a plurality of Y-axis detection coils 30B that detect induction coil 51 position on the Y-axis. Each X-axis detection coil 30A is a long narrow loop extending in the Y-axis direction, and the X-axis detection coils 30A are fixed to the inside of the top plate 21 at specified intervals. The interval (d) between adjacent X-axis detection coils 30A is smaller than the outside diameter (D) of the induction coil 51, and preferably the interval (d) between X-axis detection coils 30A is from ¼ times to 1 times the induction coil 51 outside diameter (D). The position of the induction coil 51 on the X-axis can be detected more accurately by reducing the interval (d) between X-axis detection coils 30A. Each Y-axis detection coil 30B is a long narrow loop extending in the X-axis direction, and the Y-axis detection coils 30B are also fixed to the inside of the top plate 21 at specified intervals. In the same manner as the X-axis detection coils 30A, the interval (d) between adjacent Y-axis detection coils 30B is smaller than the outside diameter (D) of the induction coil 51, and preferably the interval (d) between Y-axis detection coils 30B is from ¼ times to 1 times the induction coil 51 outside diameter (D). The position of the induction coil 51 on the Y-axis can also be detected more accurately by reducing the interval (d) between Y-axis detection coils 30B.

Figure 10:
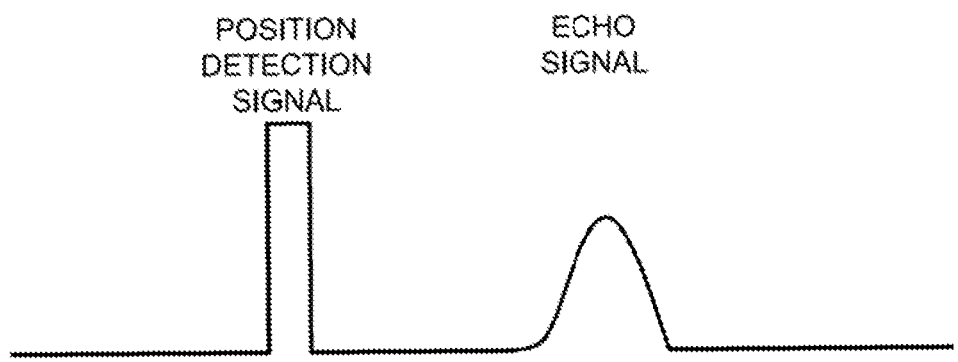
FIG. 10 is a waveform diagram showing an example of an echo signal output from the induction coil excited by a position detection signal.

The detection signal generating circuit 31 issues pulse signals, which are the position detection signals, with a specified timing. A position detection coil 30, which has input a position detection signal, excites a nearby induction coil 51 via the position detection signal. The induction coil 51, which has been excited by a position detection signal, outputs an echo signal, which is generated by the energy of the induced current flow, and that echo signal is detected by the position detection coil 30. Specifically, as shown in FIG. 10, following a given delay time after a position detection signal has been input, the induction coil 51 generates an echo signal, and that echo signal is induced in the position detection coil 30 near the induction coil 51. The echo signal induced in the position detection coil 30 is sent from the receiving circuit 32 to the discrimination circuit 33. The discrimination circuit 33 uses the echo signal input from the receiving circuit 32 to determine if the induction coil 51 is close to the position detection coil 30. When echo signals are induced in a plurality of position detection coils 30, the discrimination circuit 33 determines that the position detection coil 30 with the largest amplitude echo signal is closest to the induction coil 51.

The position detection controller 14 shown in FIG. 6 connects each position detection coil 30 to the receiving circuit 32 via a switching matrix 34. Since this position detection controller 14 can connect a plurality of position detection coils 30 by sequential switching, echo signals from a plurality of position detection coils 30 can be detected with one receiving circuit 32. However, a receiving circuit can also be connected to each position detection coil to detect the echo signals.

In the position detection controller 14 of FIG. 6, the discrimination circuit 33 controls the switching matrix 34 to sequentially switch each of the position detection coils 30 for connection to the receiving circuit 32. Since the detection signal generating circuit 31 is connected outside the switching matrix 34, it outputs position detection signals to each position detection coil 30. The amplitude of the position detection signals output from the detection signal generating circuit 31 to the position detection coils 30 is extremely large compared to the echo signals from the induction coil 51. The receiving circuit 32 has a diode connected to its input-side that forms a voltage limiting circuit 35. Position detection signals input to the receiving circuit 32 from the detection signal generating circuit 31 are voltage limited by the limiting circuit 35. Low amplitude echo signals are input to the receiving circuit 32 without voltage limiting. The receiving circuit 32 amplifies and outputs both position detection signals and the echo signals. An echo signal output from the receiving circuit 32 is a signal that is delayed from the position detection signal by a given delay time such as several μsec to several hundred μsec. Since the echo signal delay time from the position detection signal is constant, a signal received after the constant delay time is assumed to be an echo signal, and the proximity of a position detection coil 30 to the induction coil 51 is determined from the amplitude of that echo signal.

The receiving circuit 32 is an amplifier that amplifies echo signals input from the position detection coils 30. The receiving circuit 32 outputs each position detection signal and echo signal. The discrimination circuit 33 determines if the induction coil 51 is placed next to a position detection coil 30 from the position detection signal and echo signal input from the receiving circuit 32. The discrimination circuit 33 is provided with an analog-to-digital (A/D) converter 36 to convert the signals input from the receiving circuit 32 to digital signals. Digital signals output from the A/D converter 36 are processed to detect the echo signals. The discrimination circuit 33 detects a signal that is delayed from the position detection signal by a given delay time as an echo signal, and determines if the induction coil 51 is close to the position detection coil 30 from the amplitude of the echo signal.

The discrimination circuit 33 controls the switching matrix 34 to sequentially connect each of the plurality of X-axis detection coils 30A to the receiving circuit 32 to detect the position of the induction coil 51 along the X-axis. For each X-axis detection coil 30A connected to the receiving circuit 32, the discrimination circuit 33 outputs a position detection signal to that X-axis detection coil 30A and determines if the induction coil 51 is close to that X-axis detection coil 30A by detection or lack of detection of an echo signal after a given delay time from the position detection signal. The discrimination circuit 33 connects each one of the X-axis detection coils 30A to the receiving circuit 32, and determines if the induction coil 51 is close to any of the X-axis detection coils 30A. If the induction coil 51 is close to one of the X-axis detection coils 30A, an echo signal will be detected when that X-axis detection coil 30A is connected to the receiving circuit 32. Consequently, the discrimination circuit 33 can determine the position of the induction coil 51 along the X-axis from the X-axis detection coil 30 that outputs an echo signal. When the induction coil 51 straddles a plurality of X-axis detection coils 30, echo signals can be detected by a plurality of X-axis detection coils 30A. In that case, the discrimination circuit 33 determines that the induction coil 51 is closest to the X-axis detection coil 30A that detects the strongest echo signal, which is the echo signal with the largest amplitude. The discrimination circuit 33 controls the Y-axis detection coils 30B in the same manner to determine the position of the induction coil 51 along the Y-axis.

The discrimination circuit 33 controls the moving mechanism 13 according to the detected X-axis position and Y-axis position to move the power supply coil 11 close to the induction coil 51. The discrimination circuit 33 controls the X-axis servo motor 22A to move the power supply coil 11 to the induction coil 51 position on the X-axis. The discrimination circuit 33 also controls the Y-axis servo motor 22B to move the power supply coil 11 to the induction coil 51 position on the Y-axis.

The first position detection controller 14A moves the power supply coil 11 to a position close to the induction coil 51 in the manner described above. The charging pad of the present invention can move the power supply coil 11 close to the induction coil 51 with the first position detection controller 14A, and subsequently transmit power from the power supply coil 11 to the induction coil 51 to charge the internal battery 52. However, the charging pad can further refine the position of the power supply coil 11 and move it still closer to the induction coil 51 to subsequently transmit power and charge the internal battery 52. The power supply coil 11 is more precisely positioned close to the induction coil 51 by the second position detection controller 14B.

Figure 11:
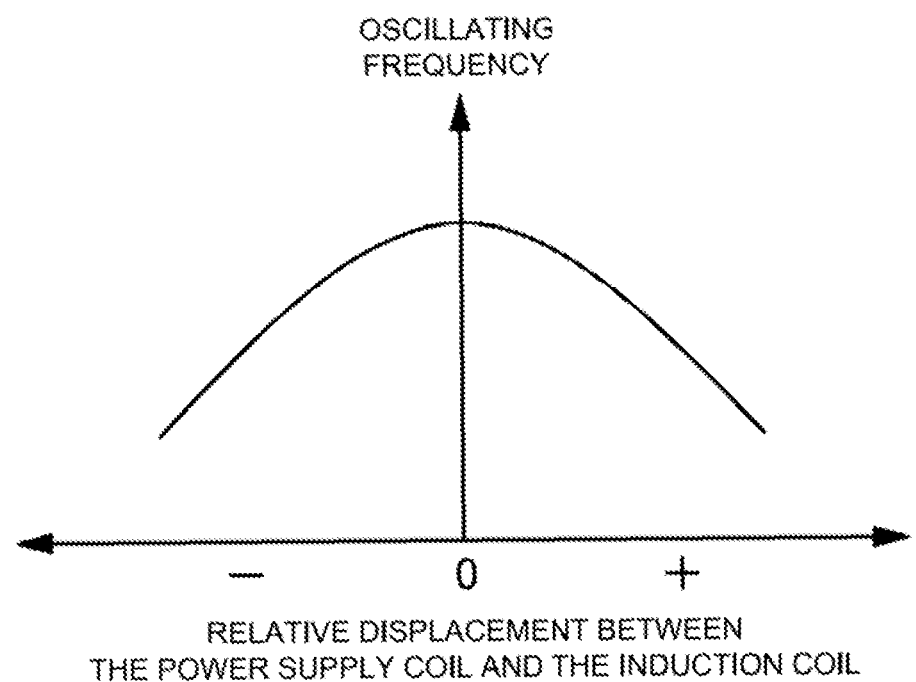
FIG. 11 is a graph showing oscillation frequency as a function of the relative positional offset of the power supply coil and the induction coil.

The second position detection controller 14B has an AC power source 12 that is a self-excited oscillator circuit, and the second position detection controller 14B controls the moving mechanism 13 to move the power supply coil 11 to a position accurately determined by the oscillating frequency of the self-excited oscillator circuit. The second position detection controller 14B controls the moving mechanism 13 X-axis servo motor 22A and Y-axis servo motor 22B to move the power supply coil 11 along the X and Y-axes while detecting the AC power source 12 oscillating frequency. Self-excited oscillator circuit oscillating frequency characteristics are shown in FIG. 11. This figure shows the oscillating frequency as a function of the relative offset (displacement) between the power supply coil 11 and the induction coil 51. As shown in this figure, the oscillating frequency of the self-excited oscillator circuit has a maximum where the power supply coil 11 and induction coil 51 are closest, and the oscillating frequency drops off as the two coils become separated. The second position detection controller 14B controls the moving mechanism 13 X-axis servo motor 22A to move the power supply coil 11 along the X-axis, and stops the power supply coil 11 where the oscillating frequency reaches a maximum. Similarly, the second position detection controller 14B controls the Y-axis servo motor 22B in the same manner to move the power supply coil 11 along the Y-axis, and stops the power supply coil 11 where the oscillating frequency reaches a maximum. The second position detection controller 14B can move the power supply coil 11 in the manner described above to a position that is closest to the induction coil 51.

In the charging pad described above, the first position detection controller 14A roughly detects the position of the induction coil 51. Subsequently, the second position detection controller 14B finely adjusts the power supply coil 11 position to move it still closer to the induction coil 51. However, the position detection controller 44 shown in FIG. 12 and described below can move the power supply coil 11 close to the induction coil 51 without a fine adjustment operation.

Figure 12:
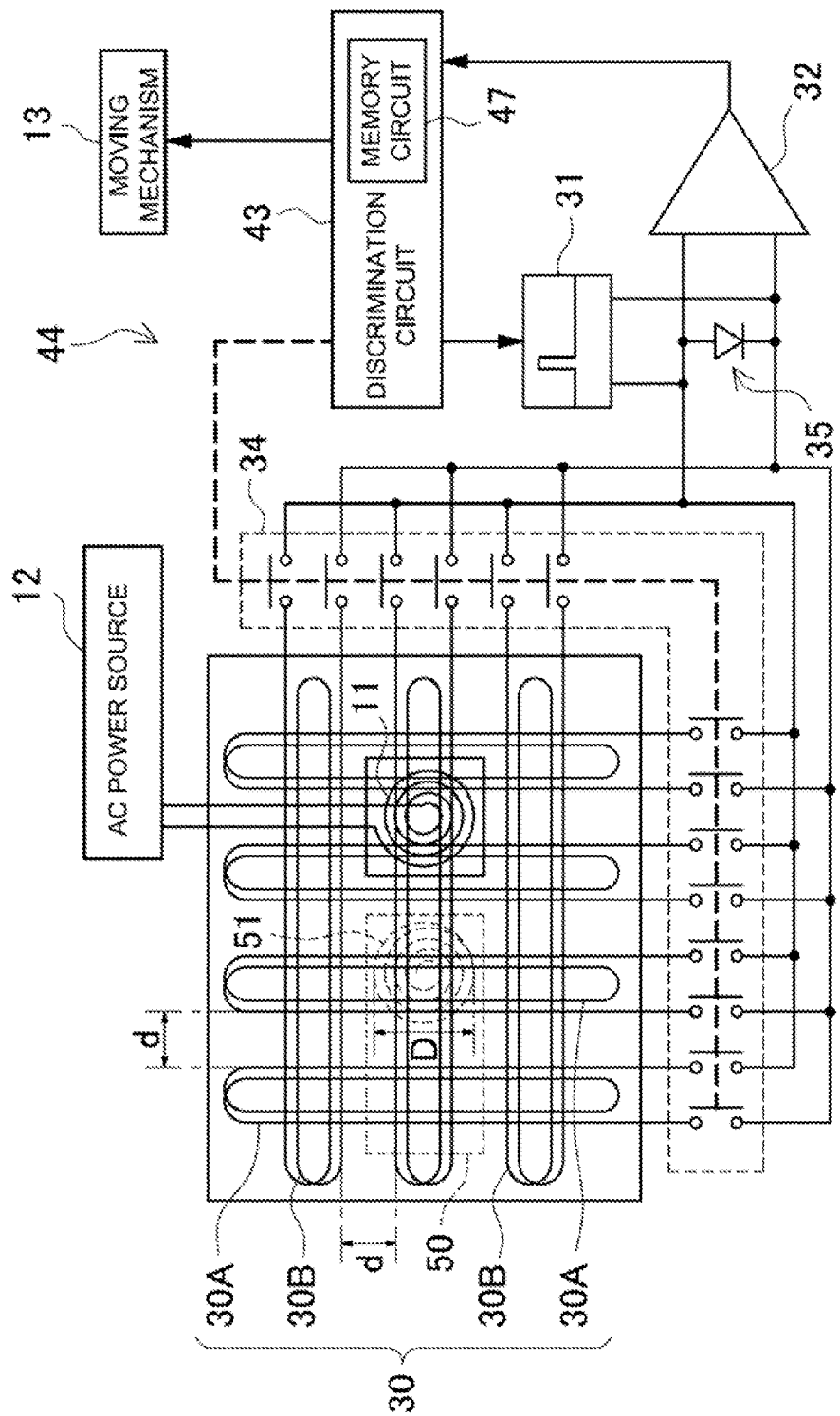
FIG. 12 is a circuit diagram showing another example of a charging pad position detection controller.

As shown in FIG. 12, the position detection controller 44 is provided with a plurality of position detection coils 30 fixed to the inside of the top plate, a detection signal generating circuit 31 that supplies position detection signals to the position detection coils 30, a receiving circuit 32 that receives echo signals from the position detection coils 30 resulting from excitation of the induction coil 51 by pulse signals supplied to the position detection coils 30 from the detection signal generating circuit 31, and a discrimination circuit 43 that determines induction coil 51 position from the echo signals received by the receiving circuit 32. In this position detection controller 44, the discrimination circuit 43 is provided with a memory circuit 47 to store the amplitude of echo signals induced in each position detection coil 30 corresponding to induction coil 51 position. Specifically, this is the amplitude of echo signals resulting from induction coil 51 excitation that are induced in each position detection coil 30 after a given delay time, as shown in FIG. 10. The position detection controller 44 detects the amplitude of the echo signal induced in each position detection coil 30, and compares the detected echo signal amplitude with the echo signal amplitudes stored in the memory circuit 47 to determine the induction coil 51 position.

Figure 13:
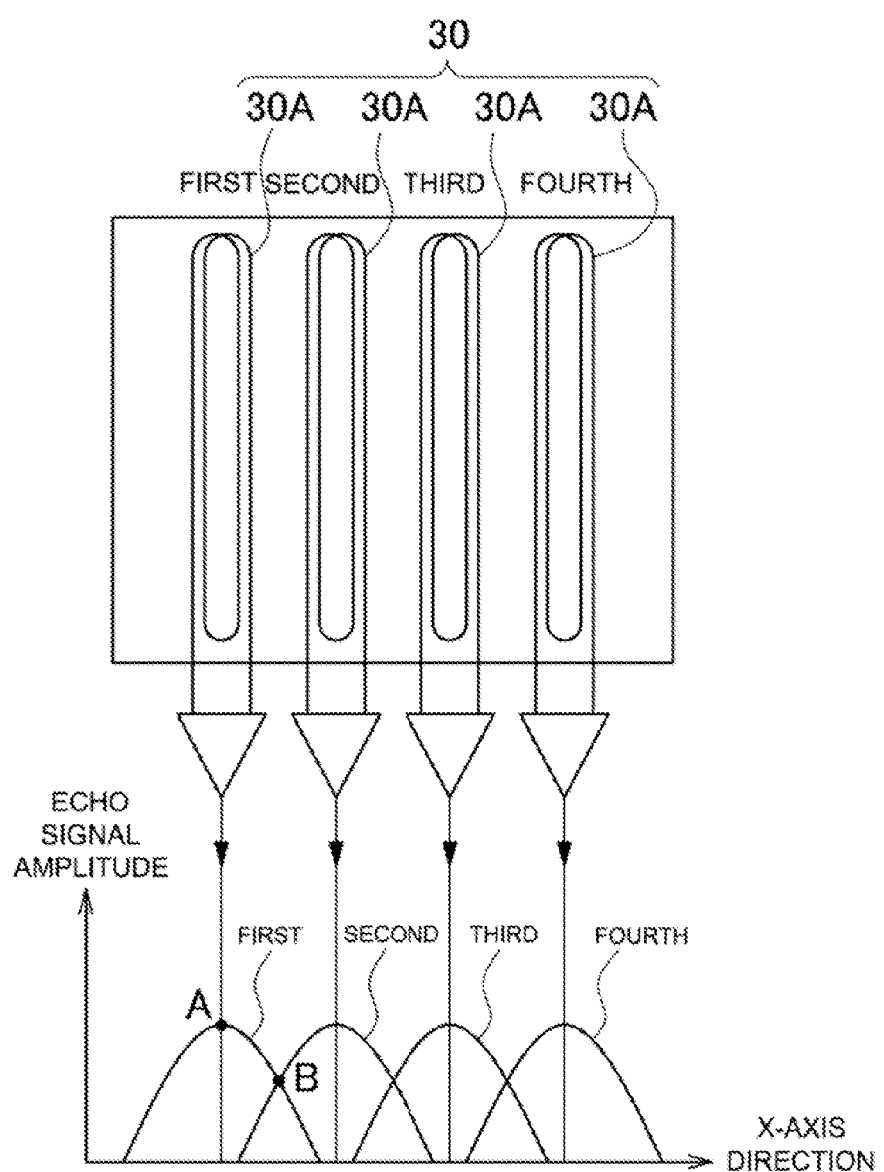
FIG. 13 is a schematic and graph showing the signal levels (amplitudes) of echo signals induced in the position detection coils of the position detection controller shown in FIG. 12.

The position detection controller 44 determines induction coil 51 position from the amplitude of the echo signal induced in each position detection coil 30 in the following manner. The position detection coils 30 shown in FIG. 12 are provided with a plurality of X-axis detection coils 30A that detect induction coil 51 position on the X-axis, and a plurality of Y-axis detection coils 30B that detect induction coil 51 position on the Y-axis. The position detection coils 30 are fixed to the inside of the top plate 21 at specified intervals. Each X-axis detection coil 30A is a long narrow loop extending in the Y-axis direction, and each Y-axis detection coil 30B is a long narrow loop extending in the X-axis direction. FIG. 13 shows the amplitude of the echo signal induced in each X-axis detection coil 30A as the induction coil 51 is moved along the X-axis. The horizontal axis of FIG. 13 shows the position of the induction coil 51 on the X-axis, and the vertical axis shows the amplitude of the echo signal induced in each X-axis detection coil 30A. This position detection controller 44 can determine the position of the induction coil 51 on the X-axis by detecting the amplitude of the echo signal induced in each X-axis detection coil 30A. As shown in FIG. 13, the amplitude of the echo signal induced in each X-axis detection coil 30A changes as the induction coil 51 position along the X-axis changes. For example, when the center of the induction coil 51 is at the center of the first X-axis detection coil 30A, the amplitude of the echo signal induced in the first X-axis detection coil 30A is a maximum as shown by point A in FIG. 13. When the induction coil 51 is halfway between the first and second X-axis detection coils 30A, the amplitude of the echo signals induced in the first and second X-axis detection coils 30A is equal as shown by point B in FIG. 13. Specifically, the amplitude of an echo signal detected in an X-axis detection coil 30A is maximum (strongest signal) when the induction coil 51 is closest to that detection coil, and the amplitude of the echo signal decreases as the induction coil 51 is separated from that detection coil. Therefore, the X-axis detection coil 30A closest to the induction coil 51 can be determined by which X-axis detection coil 30A has the largest amplitude echo signal. When echo signals are induced in two X-axis detection coils 30A, the direction of induction coil 51 offset from the X-axis detection coil 30A with the largest echo signal amplitude can be determined from the direction, relative to the X-axis detection coil 30A with the largest echo signal, of the other X-axis detection coil 30A that detects an echo signal. Further, the relative position of the induction coil 51 between two X-axis detection coils 30A can be determined from the ratio of the amplitudes of the echo signals induced in the two X-axis detection coils 30A. For example, if the ratio between echo signal amplitudes detected in two X-axis detection coils 30A is one, the induction coil 51 position can be determined to be halfway between the two X-axis detection coils 30A.

The discrimination circuit 43 stores in the memory circuit 47 the echo signal amplitude induced in each X-axis detection coil 30A corresponding to induction coil 51 position on the X-axis. When an induction coil 51 is placed on the charging pad 10, an echo signal is detected in one of the X-axis detection coils 30A. Therefore, the discrimination circuit 43 can determine from the echo signal induced in the X-axis detection coil 30A that an induction coil 51 has been placed on the charging pad 10; namely, that a device housing a battery 50 has been placed on the charging pad 10. Further, by comparing the amplitude of the echo signal induced in each X-axis detection coil 30A with the amplitudes stored in the memory circuit 47, the position of the induction coil 51 on the X-axis can be determined. The discrimination circuit can also store a function in the memory circuit that specifies induction coil X-axis position corresponding to the ratio of the amplitudes of echo signals induced in adjacent X-axis detection coils. Induction coil position can be determined from the function stored in memory. This function can be determined by moving the induction coil between two X-axis detection coils and measuring the ratio of the echo signal amplitudes in the two detection coils. In this method, the discrimination circuit 43 detects the ratio of the amplitudes of echo signals induced in two X-axis detection coils 30A. Based on the function stored in memory, the X-axis position of the induction coil 51 between the two X-axis detection coils 30A can be computed from the detected echo signal amplitude ratio.

Discrimination circuit 43 detection of induction coil 51 X-axis position from echo signals induced in the X-axis detection coils 30A is described above. Induction coil 51 position on the Y-axis can be detected in a similar manner from echo signals induced in the Y-axis detection coils 30B.

When the discrimination circuit 43 has detected the induction coil 51 position on the X and Y-axes, the position detection controller 44 moves the power supply coil 11 to the induction coil 51 position based on a position signal issued from the discrimination circuit 43.

When an echo signal having the previously described waveform is detected, the charging pad discrimination circuit 43 can recognize and distinguish that an induction coil 51 of a device housing a battery 50 has been placed on the charging pad. When a waveform is detected and determined to be different from an echo signal, an object other than the induction coil 51 of a device housing a battery 50 (for example, a metal foreign object) is assumed to be on the charging pad and the supply of power can be terminated. In addition, when no echo signal waveform is detected, it is assumed that no device housing a battery 50 induction coil 51 has been placed on the charging pad and power is not supplied.

The charging pad 10 position detection controller 14, 44 controls the moving mechanism 13 to move the power supply coil 11 close to the induction coil 51. In this state, AC power is supplied to the power supply coil 11 from the AC power source 12. AC power from the power supply coil 11 is transmitted to the induction coil 51 and used to charge the battery 52. When full-charge of the battery 52 is detected in the device housing a battery 50, charging is stopped and a full-charge signal is sent to the charging pad 10. The full-charge signal can be sent by various methods. The device housing a battery 50 can output a full-charge signal to the induction coil 51, and the full-charge signal can be sent from the induction coil 51 to the power supply coil 11 to transmit full-charge information to the charging pad 10. The device housing a battery 50 can output an AC signal to the induction coil 51 with a frequency different from that of the AC power source 12, and the charging pad 10 can receive that AC signal with the power supply coil 11 to detect full-charge. The device housing a battery 50 can output a full-charge signal to the induction coil 51 that is a modulated carrier wave with a specified frequency, and the charging pad 10 can receive the carrier wave of specified frequency and demodulate that signal to detect the full-charge signal. Further, the device housing a battery can wirelessly transmit a full-charge signal to the charging pad to send the full-charge information. Here, the device housing a battery contains a transmitter to send the full-charge signal, and the charging pad contains a receiver to receive the full-charge signal. The position detection controller 14 shown in FIG. 7 contains a full-charge detection circuit 17 to detect full-charge of the internal battery 52. This full-charge detection circuit 17 detects a full-charge signal sent from the device housing a battery 50 to detect battery 52 full-charge.

It should be apparent to those with an ordinary skill in the art that while various preferred embodiments of the invention have been shown and described, it is contemplated that the invention is not limited to the particular embodiments disclosed, which are deemed to be merely illustrative of the inventive concepts and should not be interpreted as limiting the scope of the invention, and which are suitable for all modifications and changes falling within the spirit and scope of the invention as defined in the appended claims. The present application is based on Application No. 2009-270603 filed in Japan on Nov. 27, 2009, the content of which is incorporated herein by reference.

What is claimed is:

1. A charging system, comprising:
a charging pad that includes a power supply coil; and
a device housing an internal battery and containing an induction coil that magnetically couples with the power supply coil,
wherein power transmitted from the power supply coil to the induction coil is used to charge the internal battery contained in the device,
the device housing the internal battery also comprises:
a rectifying circuit that rectifies AC power induced in the induction coil;
a charging circuit that charges the internal battery contained in the device with output from the rectifying circuit;
a shorting circuit that short circuits the terminals of the induction coil; and
a control circuit that controls the shorting circuit ON when a charging abnormality is detected, and
the control circuit detects a charging abnormality during power transmission from the charging pad power supply coil to the induction coil of the device housing the internal battery, and controls the shorting circuit ON to form a closed circuit that short-circuits the terminals of the induction coil so that the supply of power from the induction coil to the rectifying circuit is cut off.

2. The charging system as recited in claim 1 wherein the rectifying circuit is a synchronous rectifying circuit.

3. The charging system as recited in claim 2 wherein the synchronous rectifying circuit is provided with a FET bridge circuit, and FETs in the FET bridge circuit serve a dual purpose as the shorting circuit.

4. The charging system as recited in claim 1 wherein the shorting circuit short circuits the induction coil terminals through a series capacitor.

5. The charging system as recited in claim 1 wherein a positive temperature coefficient device (PTC device) is connected in series with the induction coil, and the PTC device activates to cut-off power supplied from the induction coil to the rectifying circuit when abnormal power is supplied to the induction coil.

6. The charging system as recited in claim 1 wherein the shorting circuit is a shorting switch that short circuits the output-side of the induction coil.

7. The charging system as recited in claim 6 wherein the shorting circuit shorting switch is a semiconductor switching device.

8. The charging system as recited in claim 1 wherein the control circuit determines a charging abnormality when power transmission from the charging pad cannot be stopped even after protection circuitry provided in the device housing the internal battery has disconnected the internal battery due to over-charging.

9. The charging system as recited in claim 1 wherein the control circuit determines a charging abnormality when it detects abnormal power induced in the induction coil.

10. The charging system as recited in claim 1 wherein the control circuit determines a charging abnormality when it detects that power transmission from the charging pad cannot be stopped after charging of the internal battery has been stopped.

11. The charging system as recited in claim 1 wherein the device housing the internal battery is provided with a temperature sensor that detects the temperature of the internal battery, and the control circuit compares the detected battery temperature with a set value and determines whether or not to start charging the internal battery.

12. The charging system as recited in claim 11, wherein the temperature of the internal battery is below the set value, the control circuit controls the shorting circuit ON when power transmission from the charging pad begins, energy transmitted from the charging pad is not used to charge the internal battery but rather to raise the temperature of metal components surrounding the internal battery, and when battery temperature rises to the set value, the control circuit controls the shorting circuit OFF to begin charging the internal battery.

* * * * *